United States Patent [19]

Fukushima et al.

[11] Patent Number: 4,999,142

[45] Date of Patent: Mar. 12, 1991

[54] METHOD OF MOLDING A LENS ARRAY

[75] Inventors: Tetsuo Fukushima, Hirakata; Toshinori Otsuki, Yawata; Shinji Okada, Neyagawa; Kenichiro Seutsugu, Amagasaki, all of Japan

[73] Assignee: Matsushita Electric Industrial Co., Ltd., Kadoma, Japan

[21] Appl. No.: 364,901

[22] Filed: Jun. 6, 1989

[30] Foreign Application Priority Data

Jun. 7, 1988 [JP] Japan ................................ 63-140015

[51] Int. Cl.[5] ............................................ B29D 11/00
[52] U.S. Cl. ..................................... 264/1.7; 264/1.5; 264/1.9; 264/328.8
[58] Field of Search ................... 264/1.5, 1.7, 1.9, 262, 264/328.8

[56] References Cited

U.S. PATENT DOCUMENTS

| 3,956,587 | 5/1976 | Nelson | 264/1.5 |
|---|---|---|---|
| 4,344,901 | 8/1982 | Keathley | 264/262 |
| 4,592,886 | 6/1986 | Mannherz | 264/262 |
| 4,603,023 | 7/1986 | Mack et al. | 264/262 |

FOREIGN PATENT DOCUMENTS

| 2736534 | 2/1978 | Fed. Rep. of Germany | 264/1.7 |
|---|---|---|---|
| 51538 | 11/1986 | Japan | 264/1.7 |

Primary Examiner—James Lowe
Attorney, Agent, or Firm—Cushman, Darby & Cushman

[57] ABSTRACT

A lens array of rod lenses (16), to be used for reading image data in document copier, facsimile, printer, white board scanner, and so on, is made by injection molding of a transparent resin in an already made plastic lens-holding frame (3) having an array of through-holes (2) and gates (1) leading to respective through-holes (2) for injecting melted transparent resin therethrough, both ends of the through-holes having cores (6) and (7) with concave faces.

4 Claims, 5 Drawing Sheets

FIG.3 (A) (Prior Art)
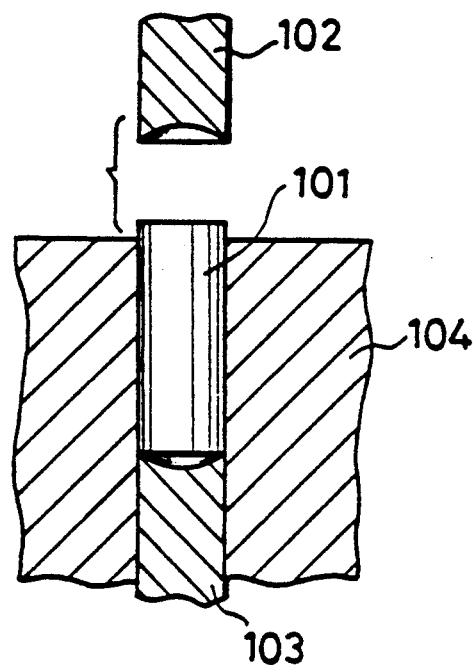
FIG.3 (B) (Prior Art)
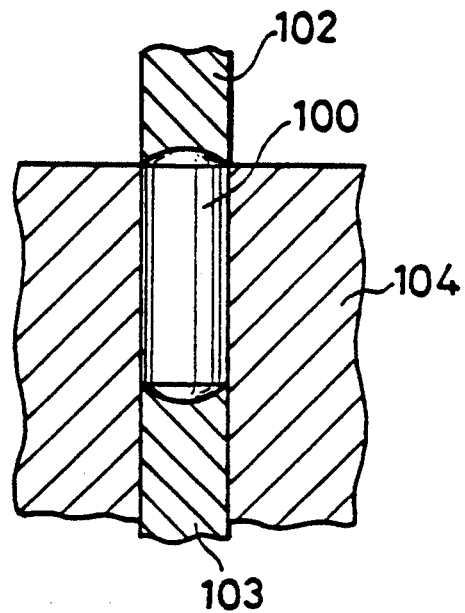

METHOD OF MOLDING A LENS ARRAY

BACKGROUND OF THE INVENTION

1. FIELD OF THE INVENTION

The present invention relates to manufacturing of lens array which is to be used as a lens system of document copier, facsimile, printer, white board scanner and so on.

2. DESCRIPTION OF THE PRIOR ART

As a conventional lens array which is to be used for reading of image data. SELFOC lens array (trade mark of Nippon Sheet Glass Company, Limited) which has arrays of graded index lenses is known and widely used in the art.

Furthermore, a lens array, for example shown in Japanese Published Unexamined Patent Application Sho 53-122426 or Sho 55-83071 is known, wherein rod lens arrays are doubled upper and lower.

In the former case of graded index lens array, it is necessary to make accurate gradation of index of glass in radial direction of the lenses. Therefore, manufacturing system of the graded index lenses is complicated, processing time thereof becomes long and the graded index lens array is expensive.

In the latter case of rod lens array, respective rod lenses are generally formed by compression molding shown in FIGS. 3(A) and 3(B). In FIG. 3(A), a rod 101 of transparent resin is inserted in a die 104 and the die 104 is heated for softening the rod of transparent resin 101. Thereafter, core inserts 102 and 103 respectively having mirror-finished concave surfaces are pressed on the transparent resin rod 101, as shown in FIG. 3(B). Thus, the rod lens 100 is formed. Thereafter, a plurality of the rod lens are inserted in a lens-holding frame of a block plastic mold with great care so as to dispose the rod lenses with high accuracies of optical axes and axial positions.

In such conventional manufacturing of rod lenses, processing time to form the rod lenses are too long to mass-produce. And also, as the lens surface are formed by compression, the lens surfaces may be discrepant from designed curves. Furthermore, the rod lens array must have a process for inserting the rod lenses into through holes of a lens holder precisely. Therefore, the rod lens array is expensive.

SUMMARY OF THE INVENTION

Object of the present invention is to provide an improved manufacturing method of lens array without the step of inserting rod lenses into guiding holes of a lens holder, thereby the lens array can be mass-produced.

Manufacturing of lens array in accordance with the present invention has steps of:

inserting a lens-holding frame, which has at least one array of through-holes and gates formed on side walls of respective through-holes, into predetermined positions of a mold;

inserting inner cores respectively having mirror finished lens forming surfaces into the through holes from top and bottom of the through-holes;

filling spaces enclosed by the inner cores and side walls of the through-holes with transparent resin which is supplied through sprues, runners of the mold and the gates of the lens forming frame: and cooling the transparent resin by cooling the mold.

In the above-mentioned manufacturing method of lens array, the lens surfaces are molded monoblock with the lens-holding frame. Therefore, a hitherto requested step of insertion of individual rod lenses precisely into predetermined positions of the through holes against the optical axis can be omitted. And also, cost of making lens array can be reduced.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 3(A) and 3(B) are respectively cross-sectional side views showing conventional manufacturing method for forming a rod lens.

DESCRIPTION OF PREFERRED EMBODIMENTS

Preferred embodiments of a lens array and manufacturing method thereof are described referring to FIGS. 1, 2, 4, 5 and 6.

Figure 1:
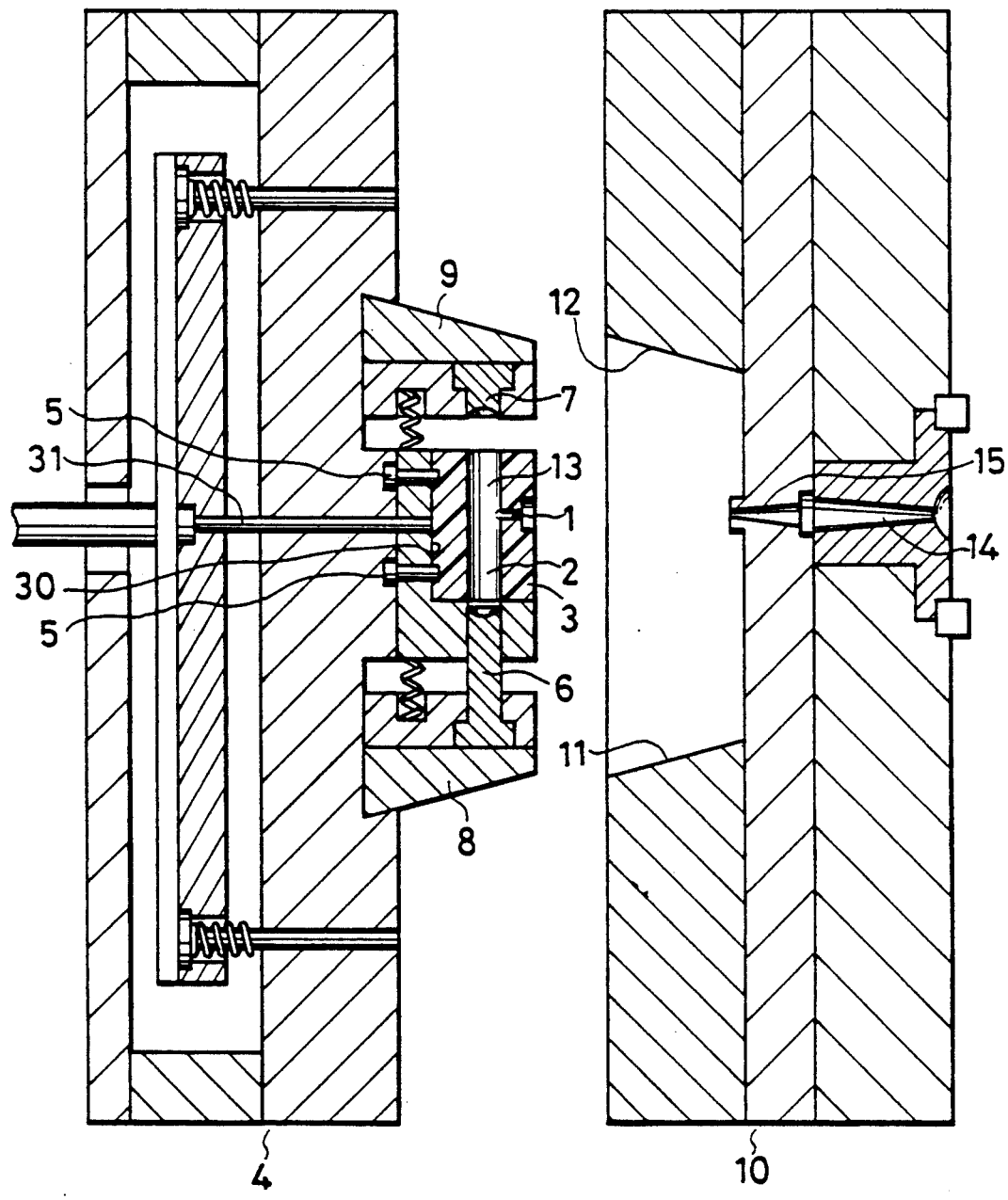
FIG. 1 is a cross-sectional side view of a die for molding lens array in accordance with the present invention when moving part and fixed part of the mold are separated.
Figure 2:
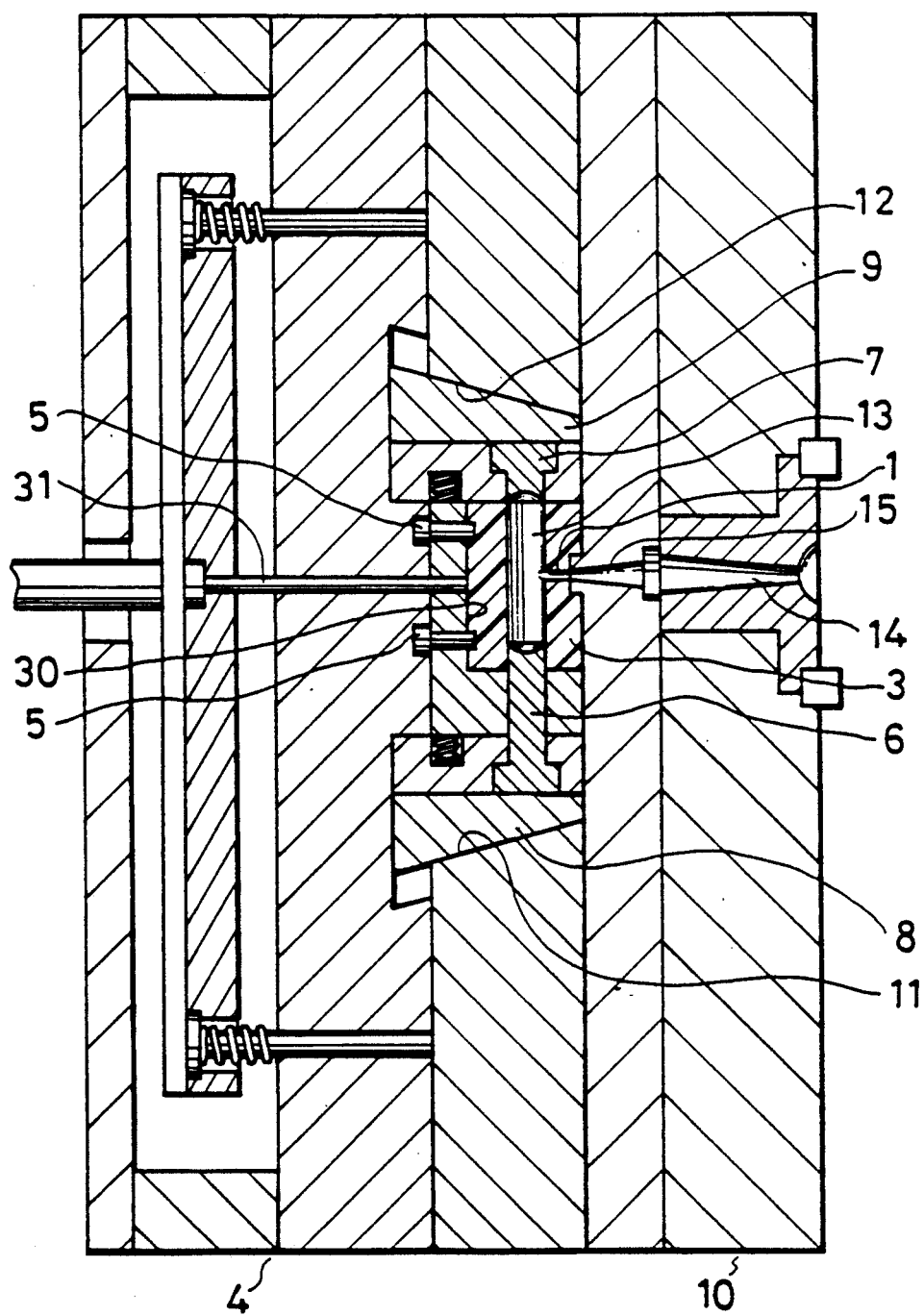
FIG. 2 is a cross-sectional side view of the mold 12 shown in FIG. 1 when the moving and fixed parts are incorporated.
Figure 4:
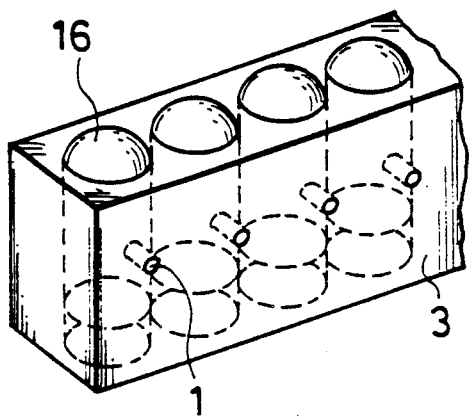
FIG. 4 is a perspective view showing a lens array in accordance with the present invention formed by the mold shown in FIGS. 1 and 2.

FIG. 1 is a cross-sectional side view of a mold 12 for molding lens array in accordance with the present invention when moving part and fixed part of the mold are separated. FIG. 2 is a cross-sectional side view of the mold shown in FIG. 1 when the moving and fixed parts are incorporated. FIG. 4 is a perspective view showing a lens array in accordance with the present invention made by the mold shown in FIGS. 1 and 2.

In FIGS. 1 and 2, a mold for making a lens array in accordance with the present invention consists of a moving part 4 and a fixed part 10. The moving part 4 comprises: a frame holder 30 wherein a lens-holding frame 3 is held; connecting pins 5 and 5 whereby the lens-holding frame 3 is precisely positioned on the frame holder 30; slide cores 8 and 0 whereon core inserts 6 and 7 are respectively fixed; and an ejector pin 31 whereby a molded lens array is ejected from the mold. The fixed part 10 comprises: tapered surfaces 11 and 12; sprues 14; and gates 15. The sprues 14 and the gates 15 are arrayed in a direction vertical to sheets of FIGS. 1 and 2. The lens-holding frame 3 has gates 1 and through holes 2. Respective gates 1 are vertically formed on inner faces of respective through-holes 2. And the gates 1 and the through-holes 2 are arrayed in the direction vertical to sheets of FIGS. 1 and 2.

Steps for forming a lens array in accordance with the present invention is described.

First, a lens-holding frame 8 having array of through-holes 2 and gates 1 is fixed on a predetermined position of the frame holder 30 of the moving part 4 of the mold by fitting the connecting pins 5 and 5 thereto.

Second, when the moving part 4 and the fixed part 10 are incorporated, by moving the moving part 4 is in right hand in FIG. 1, the slide cores 8 and 9 are respectively moved above and below by sliding on the tapered surfaces 11 and 12. Thereby, core inserts 6 and 7 respectively having mirror-finished concave surfaces are fit in the through-holes 2 of the lens-holding frame 3. Thereby, array of spaces 13 wherein rod lenses are to be formed are enclosed by side walls of the through-holes 2 and the core inserts 6 and 7. By filling the transparent resin in the array of the spaces 13 by passing through arrays of the sprues 14 and the gates 15, a lens array shown in FIG. 4 is formed.

Hereupon, the mirror-finished concave surfaces of the core inserts 6 and 7 have been accurately finished in spherical or aspherical face wherein discrepancy from designed curve is limited below submicron. As a transparent resin filled in the spaces 13, polymethyl methacrylate (PMMA), polycarbonate (PC), polystyrene, or the like is used. As a filling method of the transparent resin, injection molding or injection compression molding is used.

When polymethyl methacrylate (PMMA) is used as a material of lenses, the injection molding is executed at 230° C. on a nozzle of a machine. When polycarbonate (PC) is used, the injection molding is executed at 300° C. on the nozzle.

At these times, as a lens-holding frame 3, one previously molded by resin can be used. As a material of the lens-holding frame 3, polyphenylene sulphide (PPS), polycarbonate (PC), acrylonitrile butadiene styrene (ABS) or the like are used with block pigment of dye.

When lens arrays made by manufacturing method in accordance with the present invention are used as a lens system of an image sensor, width of the arrays are necessary to be made in a range of 50-270 mm according to the object whereto lens arrays are used.

When the lens-holding frame 3 at room temperature is inserted into the mold which is heated at a predetermined temperature, the lens-holding frame 3 is expanded by heat of the mold 12. Thereby, pitch of the array of through holes 2 of the lens-holding frame 3 and pitch of the array of the core inserts 6 and 7 becomes to disagree with each other. When the disagreements between the pitch of the array of the through holes 2 and that of the core inserts 6 and 7 becomes over a predetermined tolerance thereof, the core inserts 6 and 7 may damage the lens-holding frame 3 or the core inserts 6 and 7 and/or the lens-holding frame 3 may be deformed. Therefore, it is desirable to heat the lens-holding frame 3 to a temperature equivalent to or over the temperature of the die (for example, 80-100° C.) before the injection molding process.

In such lens array formed by the above-mentioned processes, respective rod lenses 16 make inverted imageries. Therefore, it is necessary to use lens arrays of paired lenses or two lens arrays for imaging erect images of the object.

Figure 5:
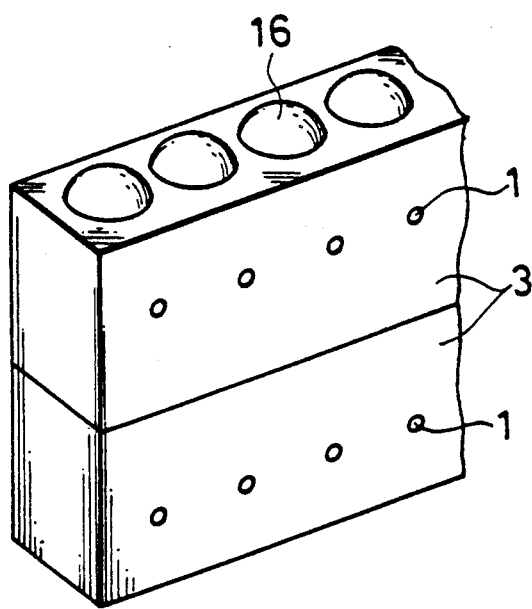
FIG. 5 is a perspective view showing an embodiment of telecentric lens system using the lens arrays in accordance with the present invention.

FIG. 5 is a perspective view showing an embodiment of telecentric lens system using two lens arrays made by the above-mentioned manufacturing method in accordance with the present invention wherein one of the lens arrays is disposed coaxially with the other lens arrays respectively.

Figure 6:
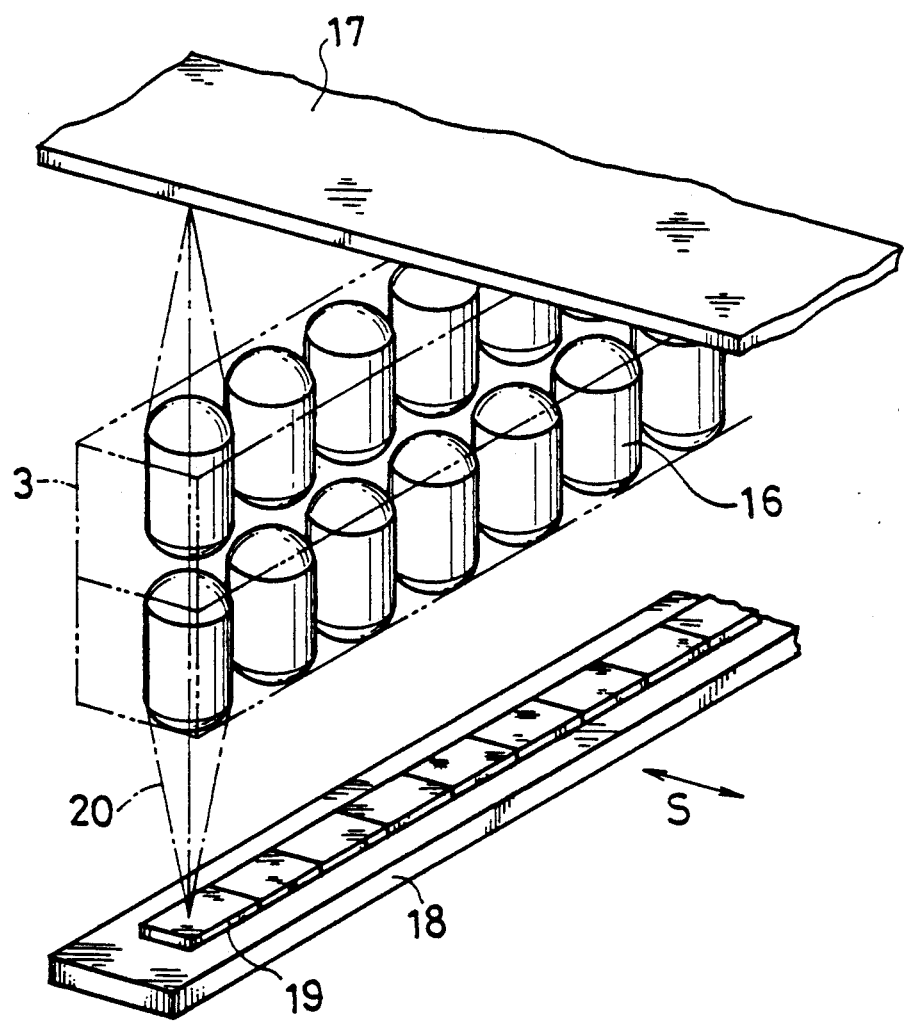
FIG. 6 is a perspective view showing an embodiment of an image sensor using the telecentric lens system shown in FIG. 5.

FIG. 6 is a perspective view showing an embodiment of an image sensor using the telecentric lens system shown in FIG. 5. In FIG. 6, document 17 and image sensor 18 are respectively provided at conjugate positions of the lens array. Numeral 20 designates optical paths of a doublet of rod lenses 16. The image sensor 18 has plural pixels 19 on its surface. Respective doublet of rod lenses 16 image erect images of small areas of a document 17 on the surface of the image sensor 18. Respective pixels 19 sense, for example, intensity of light as pattern of bright and dark of image data. By scanning the document 17 or set of lens arrays and image sensor 18 along a direction shown by arrow S, all the image data of the document 17 can be read out by the pixels 19 of the image sensor 18.

Such an optical lens system is to be used in a document copier, a facsimile, a printer, a white board scanner and so on.

As mentioned above, in the lens array made by the manufacturing process in accordance with the present invention, an array of the rod lenses 16 is formed and automatically and precisely incorporated with the lens-holding frame 3 of a material which is suitable for flare stopping. Accordingly, there is no need of using a time-taking conventional process to carefully insert the rod lenses in through-holes of the lens-holding frame.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

We claim:

1. Method of molding a lens array comprising the steps of:
   providing a mold having first and second mold parts;
   providing a lens-holding frame having at least one array of through holes defined therethrough, each said through hole having first and second open ends, a gate being defined through a side wall of each said through hole so as to be in communication with an interior space defined by the side wall of said respective through hole;
   mounting said lens-holding frame to one of said mold parts;
   mounting a plurality of inner core elements to one of said mold parts, each said inner core having a mirror finished lens-forming surface defined thereon;
   inserting a said inner core into each said open end of each said through hole so that a mold cavity is defined by the interior space of each said through hole and the mirror finished lens-forming surfaces of inner cores inserted into the open ends of said respective through hole;
   urging said mold parts together, said mold having sprues and runners in fluid communication with each said gate of said lens forming frame;
   filling said mold cavities with a transparent resin supplied through said sprues and runners of said mold and through said gates of said lens-forming frame; and
   cooling said transparent resin.

2. Method of molding a lens array in accordance with claim 1, wherein
   said transparent resin is polymethyl methacrylate, polycarbonate or polystyrene.

3. Method of molding a lens array in accordance with claim 1, wherein
   said lens-holding frame is made of polyphenylene sulphide, polycarbonate or acrylonitrile butadiene styrene (ABS).

4. Method of molding a lens array in accordance with claim 1, wherein
   said mirror finished lens forming surfaces of said inner cores are aspherical.

* * * * *

UNITED STATES PATENT AND TRADEMARK OFFICE
CERTIFICATE OF CORRECTION

PATENT NO.   : 4,999,142

DATED        : March 12, 1991

INVENTOR(S)  : FUKUSHIMA, et al.

It is certified that error appears in the above-identified patent and that said Letters Patent is hereby corrected as shown below:

On the Title Page:

[75]  Tetsuo Fukushima, Hirakata;
      Toshinori Otsuki, Yawata;
      Shinji Okada, Neyagawa;
      Kenichiro Suetsugu, Amagasaki, all of Japan Signed and Sealed this Twenty-ninth Day of September, 1992

Attest:

DOUGLAS B. COMER

*Attesting Officer*  *Acting Commissioner of Patents and Trademarks*